US012657429B2

(12) United States Patent
Tavella et al.

(10) Patent No.: US 12,657,429 B2
(45) Date of Patent: Jun. 16, 2026

(54) SYSTEMS AND METHODS FOR ARTIFICIAL INTELLIGENCE ASSISTANT PUBLISHING

(71) Applicant: Musixmatch S.P.A., Bologna (IT)

(72) Inventors: Maria Stella Tavella, Bologna (IT); Loreto Parisi, Bologna (IT); Michele Bracci, Bologna (IT); Giuseppe Costantino, Bologna (IT); Francesco Delfino, Bologna (IT); Pierfrancesco Melucci, Bologna (IT)

(73) Assignee: Musixmatch S.P.A., Bologna (IT)

( * ) Notice: Subject to any disclaimer, the term of this patent is extended or adjusted under 35 U.S.C. 154(b) by 554 days.

(21) Appl. No.: 18/337,905

(22) Filed: Jun. 20, 2023

(65) Prior Publication Data

US 2023/0409870 A1 Dec. 21, 2023

Related U.S. Application Data

(60) Provisional application No. 63/353,753, filed on Jun. 20, 2022.

(51) Int. Cl.
*G06N 3/08* (2023.01)
*G06N 3/04* (2023.01)

(52) U.S. Cl.
CPC ................. *G06N 3/04* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 10,719,624 | B2 * | 7/2020 | Abdel-Fattah | ...... H04L 63/0428 |
| 11,620,389 | B2 * | 4/2023 | Karabatis | ............... G06F 18/24 726/25 |
| 2018/0260480 | A1 * | 9/2018 | Jannink | .................. G06F 16/60 |
| 2022/0398538 | A1 * | 12/2022 | Jakobsson | ............. H04L 9/3213 |
| 2023/0022966 | A1 * | 1/2023 | Parisi | ..................... G06F 16/65 |

FOREIGN PATENT DOCUMENTS

| | | | | |
|---|---|---|---|---|
| WO | WO-2022072626 A1 * | 4/2022 | .......... | G06F 16/901 |

* cited by examiner

*Primary Examiner* — Tyler W. Sullivan
(74) *Attorney, Agent, or Firm* — Dickinson Wright PLLC; Jonathan H. Harder

(57) ABSTRACT

In one embodiment, a computer-implemented method includes training, using an artificial intelligence engine, one or more machine learning models using training data comprising identities of writers of content items as input and to output a dataset comprising identities of publishers and a respective probability that each identity of a publisher, from the identities of publishers, is associated with a respective identity of a writer from the identities of writers, receiving, via the one or more machine learning models, a first identity of a first writer; inputting the first identity of the first writer into the one or more machine learning models; outputting, via the one or more machine learning models, the dataset comprising the identities of publishers and the respective probability that each identity of the publisher, from the identities of publishers, is associated with the respective identity of the writer from the identities of writers.

20 Claims, 17 Drawing Sheets

300 ⌐

Cloud-Based Computing System
116

Server
128

Database
129

Training Engine
152

Machine Learning
Model(s)
154

Network
20

Computing Device 12

User Interface
160

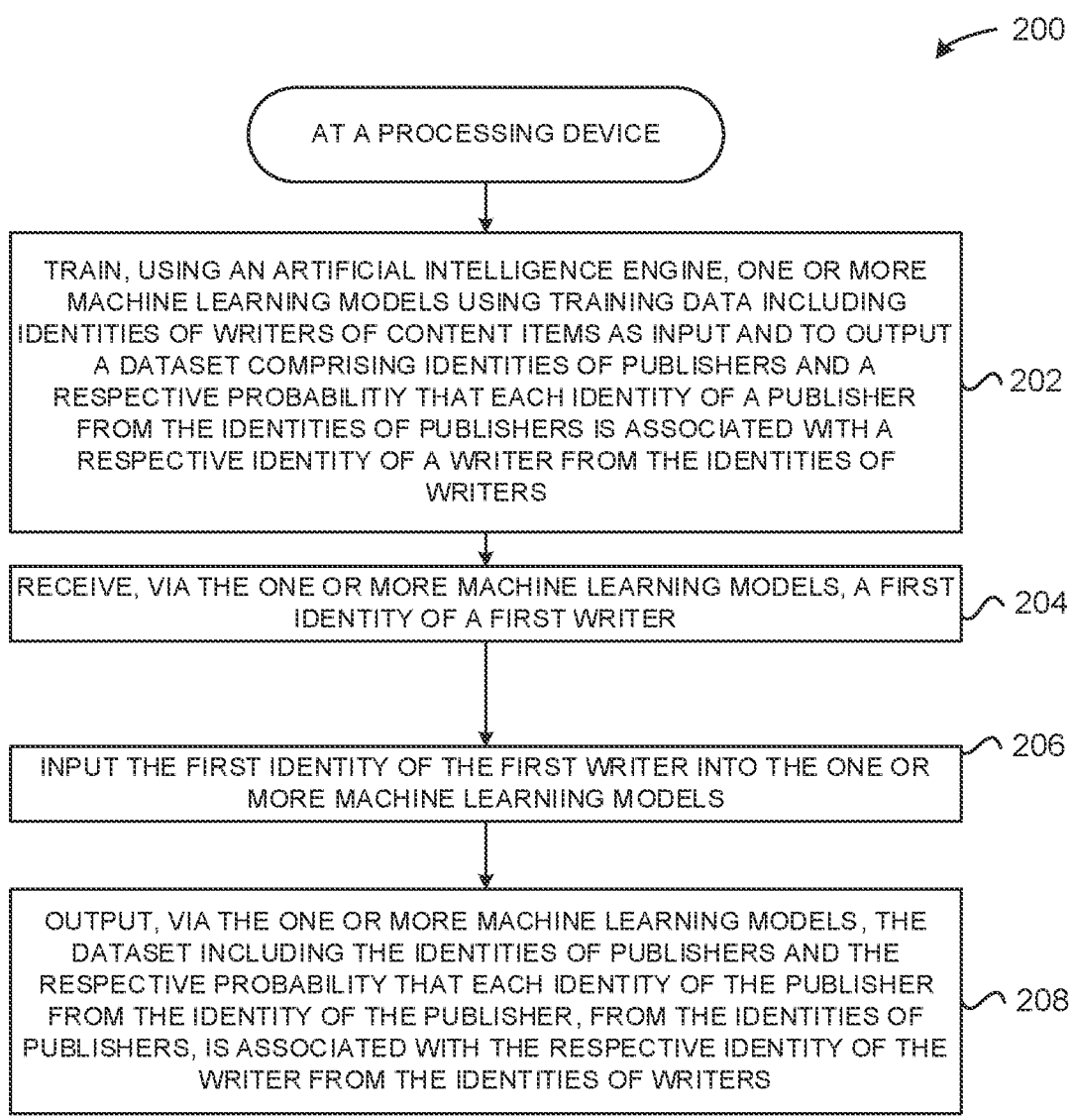

~ 200

AT A PROCESSING DEVICE

TRAIN, USING AN ARTIFICIAL INTELLIGENCE ENGINE, ONE OR MORE
MACHINE LEARNING MODELS USING TRAINING DATA INCLUDING
IDENTITIES OF WRITERS OF CONTENT ITEMS AS INPUT AND TO OUTPUT
A DATASET COMPRISING IDENTITIES OF PUBLISHERS AND A
RESPECTIVE PROBABILITY THAT EACH IDENTITY OF A PUBLISHER
FROM THE IDENTITIES OF PUBLISHERS IS ASSOCIATED WITH A
RESPECTIVE IDENTITY OF A WRITER FROM THE IDENTITIES OF
WRITERS

~ 202

RECEIVE, VIA THE ONE OR MORE MACHINE LEARNING MODELS, A FIRST
IDENTITY OF A FIRST WRITER

~ 204

INPUT THE FIRST IDENTITY OF THE FIRST WRITER INTO THE ONE OR
MORE MACHINE LEARNIING MODELS

~ 206

OUTPUT, VIA THE ONE OR MORE MACHINE LEARNING MODELS, THE
DATASET INCLUDING THE IDENTITIES OF PUBLISHERS AND THE
RESPECTIVE PROBABILITY THAT EACH IDENTITY OF THE PUBLISHER
FROM THE IDENTITY OF THE PUBLISHER, FROM THE IDENTITIES OF
PUBLISHERS, IS ASSOCIATED WITH THE RESPECTIVE IDENTITY OF THE
WRITER FROM THE IDENTITIES OF WRITERS

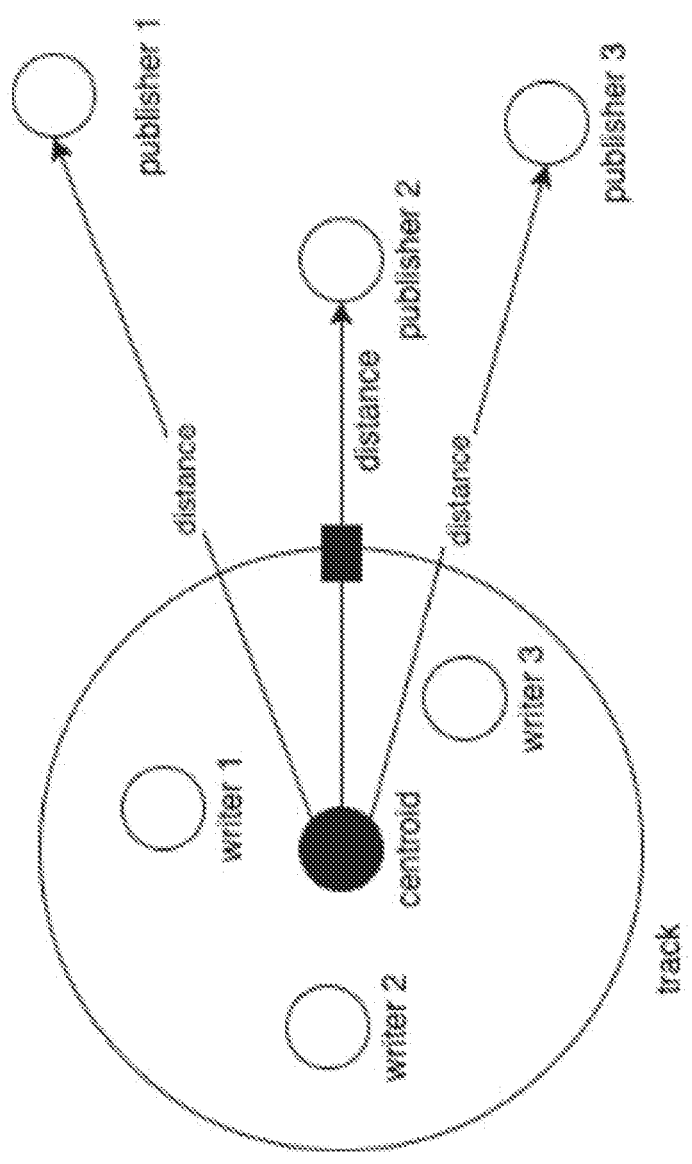
FIG. 8

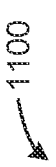
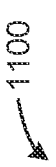
Predictions
AI Model
Low Quality Predictions (l)
High Quality Predictions (h)
Ensemble Model
Medium Quality Predictions (m)
Statistical Model
FIG. 11

1400

SYSTEMS AND METHODS FOR ARTIFICIAL INTELLIGENCE ASSISTANT PUBLISHING

CROSS-REFERENCES TO RELATED APPLICATIONS

This application claims priority to U.S. Application Patent Ser. No. 63/353,753 filed Jun. 20, 2022, titled "SYSTEMS AND METHODS FOR ARTIFICIAL INTELLIGENCE ASSISTANT PUBLISHING," the entire disclosure of which is hereby incorporated by reference for all purposes.

TECHNICAL FIELD

This disclosure relates to artificial intelligence. More specifically, this disclosure relates to systems and methods for artificial intelligence assistance publishing.

BACKGROUND

Content items (e.g., songs, movies, videos, podcasts, transcriptions, etc.) are conventionally played via a computing device, such as a smartphone, laptop, desktop, television, or the like. Each content item is usually associated with a publisher. Determining an identity of a publisher associated with a content item can be a difficult task.

SUMMARY

In one embodiment, a computer-implemented method including training, using an artificial intelligence engine, one or more machine learning models using training data comprising identities of writers of content items as input and to output a dataset comprising identities of publishers and a respective probability that each identity of a publisher from the identities of publishers is associated with a respective identity of a writer from the identities of writers. The method includes receiving, via the one or more machine learning models, a first identity of a first writer. The method includes inputting the first identity of the first writer into the one or more machine learning models and outputting, via the one or more machine learning models, the dataset including the identities of publishers and the respective probability that each identity of the publisher, from the identities of publishers, is associated with the respective identity of the writer from the identities of writers.

In one embodiment, a tangible, non-transitory computer-readable medium stores instructions that, when executed, cause a processing device to perform any operation of any method disclosed herein.

In one embodiment, a system includes a memory device storing instructions and a processing device communicatively coupled to the memory device. The processing device executes the instructions to perform any operation of any method disclosed herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which:

FIG. 2 illustrates an example of a method for using artificial intelligence to output probabilities that publishers are associated with writers according to certain embodiments of this disclosure;

FIG. 8 illustrates an example of a nearest neighbor implementation identifying each writer node and publisher node of the graph network according to certain embodiments of this disclosure;

FIG. 11 illustrates an example of combined predictions from the statistical model and graph model in order to assign quality scores according to embodiments of this disclosure;

NOTATION AND NOMENCLATURE

Figure 1:
FIG. 1 illustrates a system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The terms "graph network" and "graph neural network" may be used interchangeably herein.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 through 17, discussed below, and the various embodiments used to describe the principles of this disclosure in this patent document are by way of illustration only and should not be construed in any way to limit the scope of the disclosure.

Content item (e.g., music, movies, shows, books, podcasts, video games, papers, websites, etc.) publishing relates to the business of monetizing those content items. The publishers may ensure that the writers and/or creators receive royalties for their content items. In some instances, it may be unknown who the publisher of a certain content item is, and that may be a technically challenging problem.

For example, there may be hundreds, thousands, millions, etc. of writers, content items, and publishers that exist in the industry. The combinatorial matrix of those writers, content items, and publishers may be very complex. The mappings between which writer is associated with which content item and/or publisher may be more complex than humanly possible using pen and paper and/or their mind. In some instances, content items are uploaded to websites and/or applications without an indication of who the publisher is. Identifying the publisher may be important for licensing purposes and/or general knowledge purposes. However, without the present disclosure, identifying the publisher may be a complicated task if only the identity of the writer and content item are available for use.

To that end, the present disclosure provides a technical solution. For example, a graph network may be used to link all the various entities (e.g., recording metadata (content item title, artist name, etc.) and publishing metadata (e.g., work title, identity of writers, identity of publishers, shares between people, contractual agreements, etc.) together. One or more machine learning models trained on the graph network may predict, given an identity of a writer (or a set of writers) the most probable publisher (or set of publishers) associated with the identity of the writer.

In some embodiments, the technical solution may use graph theory to generate a graph network. A graph network $G=(V, E)$ is a structure used to represent entities and their relations. The graph network includes two sets: (i) the set of nodes V (also called vertices), and (ii) the set of edges E (also called arcs). An edge $(u, v) \in E$ connecting a pair of nodes u and v indicates that there is a relation between them. The relation may either be undirected, e.g., capturing symmetric relations between nodes, or directed, capturing asymmetric relations. Depending on the edges' directionality, a graph network may be directed or undirected.

Graph networks may be weighted or unweighted. In a weighted graph network, each edge may be associated with a scalar weight. For example, such weights might represent lengths or connectivity strengths. Graph networks may also be either homogeneous or heterogeneous. In a homogeneous graph network, all the nodes represent instances of the same type and all the edges represent relations of the same type.

Multigraphs are graph networks that can have multiple (directed) edges between the same pair of nodes, including self-loops. For instance, two authors can coauthor a paper in different years, resulting in edges with different features.

In some embodiments, the graph network may be used to identify publisher(s) associated with a writer and/or content item. For example, one or more machine learning models may be trained to receive an identity of a writer as input and to output one or more probabilities of one or more identities of publishers that may be associated with the identity of the writer and/or content item the writer created. In some embodiments, the content item may be a song, a video, a podcast, a blog, a website, a paper, etc. In some embodiments, the one or more machine learning models are trained to learn, capture, and/or identify the connections between different entities. The one or more machine learning models are trained to perform a link prediction task. The machine learning models may learn a representation of both nodes and edges and learning/predicting an existence of a link between two nodes. Once the machine learning models are trained, one or more distances between linked nodes may be determined to identify the N number of publisher nodes that are closest to a given writer node.

Turning now to the figures, FIG. 1 depicts a system architecture 10 according to some embodiments. The system architecture 10 may include one or more computing devices 12 of one or more users communicatively coupled to a cloud-based computing system 116. Each of the computing devices 12 and components included in the cloud-based computing system 116 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances, and in one example, the computing devices 12 and the cloud-based computing system 116 may communicate with a network 20. Network 20 may be a public network (e.g., connected to the Internet via wired (Ethernet) or wireless (WiFi)), a private network (e.g., a local area network (LAN) or wide area network (WAN)), or a combination thereof. Network 20 may also comprise a node or nodes on the Internet of Things (IoT).

The computing devices 12 may be any suitable computing device, such as a laptop, tablet, smartphone, or computer. The computing devices 12 may include a display capable of presenting a user interface 160 of an application. The application may be implemented in computer instructions stored on the one or more memory devices of the computing devices 12 and executable by the one or more processing devices of the computing device 12. The application may present various screens to a user. For example, the user interface 160 may present a query screen where a user may enter an identity of a writer and/or content item. The user interface 160 may present one or more publishers and one or more probabilities that the one or more publishers are associated with the writer and/or content item. The user may select a graphical element on the user interface 160 to navigate to other content items related to one of the publishers presented on the user interface 160.

Such techniques provide for enhanced navigation of content items. Further, the techniques provide for an enhanced user interface by providing the most probable publishers associated with a writer and/or content item instead of providing a massive list of publishers that publish content items. In other words, the embodiments disclosed herein provide a reduced dataset that is presented on the user interface 160 based on trained machine learning models 154 using a graph network. In some embodiments, the user interface 160 is executed by an application that is a standalone application installed and executing on the computing devices 12. In some embodiments, the application (e.g., website) executes within another application (e.g., web browser). The computing device 12 may also include instructions stored on the one or more memory devices that, when executed by the one or more processing devices of the computing devices 12 perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence (AI) engine that uses one or more machine learning models 154 to perform at least one of the embodiments disclosed herein. The cloud-based computing system 116 may also include a database 129 that stores data, knowledge, and data structures used to perform various embodiments. For example, the database 129 may store content items, time-synchronized text, tags and their association with the time-synchronized text, user profiles, writer metadata, publisher metadata, etc. In some embodiments, the database 129 may be hosted on one or more of the servers 128.

In some embodiments the cloud-based computing system 116 may include a training engine 152 capable of generating the one or more machine learning models 154. The machine learning models 154 may be trained to receive an identity of a writer and/or content item and output one or more publishers associated with the writer and/or content and one or more probabilities that the one or more publishers are associated with the writer and/or content item, among other things. The one or more machine learning models 154 may be generated by the training engine 152 and may be implemented in computer instructions executable by one or more processing devices of the training engine 152 and/or the servers 128. To generate the one or more machine learning models 154, the training engine 152 may train the one or more machine learning models 154.

The training engine 152 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 152 may be cloud-based, be a real-time software platform, include privacy software or protocols, and/or include security software or protocols.

To generate the one or more machine learning models 154, the training engine 152 may train the one or more machine learning models 154. The training engine 152 may use a base data set of tuples including writers, content item metadata, contractual agreements, shares included in the contractual agreements, publishers, work titles, or some combination thereof.

The one or more machine learning models 154 may refer to model artifacts created by the training engine 152 using training data that includes training inputs and corresponding target outputs. The training engine 152 may find patterns in the training data wherein such patterns map the training input to the target output and generate the machine learning models 154 that capture these patterns. For example, the machine learning model may receive an identity of a writer, determine a probability a publisher is associated with the writer based on distances between nodes in a graph network. Although depicted separately from the server 128, in some embodiments, the training engine 152 may reside on server 128. Further, in some embodiments, the database 129, and/or the training engine 152 may reside on the computing devices 12.

As described in more detail below, the one or more machine learning models 154 may comprise, e.g., a single level of linear or non-linear operations (e.g., a support vector machine [SVM]) or the machine learning models 154 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

FIG. 2 illustrates an example of a method 200 for using artificial intelligence to output probabilities that publishers are associated with writers according to certain embodiments of this disclosure. The method 200 may be performed by processing logic that may include hardware (circuitry, dedicated logic, etc.), software, or a combination of both. The method 200 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 200. The method 200 may be implemented as computer instructions stored on a memory device and executable by the one or more processors. In certain implementations, the method 200 may be performed by a single processing thread. Alternatively, the method 200 may be performed by two or more processing threads, each thread implementing one or more individual functions, routines, subroutines, or operations of the methods.

At block 202, the processing device may train, using the training engine 152, one or more machine learning models 154 using training data including identities of content items as input and to output a dataset including identities of publishers and a respective probability that each identity of a publisher, from the identities of publishers, is associated with a respective identity of a writer from the identities of writers.

In some embodiments, the one or more machine learning models 154 are trained using a representation of both nodes and edges of a graph network and the one or more machine learning models are trained to identify existences of links between the nodes. In some embodiments, the nodes represent information pertaining to entities including writers, content item metadata (content item title, artist name, etc.), contractual agreements, shares (for each person associated with the content item) included in the contract agreements, publishers, work titles, or some combination thereof. In some embodiments, the representation may include a graph network. In some embodiments, training the one or more machine learning models 154 may include using a function that arranges dissimilar pairs of writer nodes and publisher nodes to be distant from any similar pairs of writers and/or publishers by at least a certain margin value.

In some embodiments, training the one or more machine learning models 154 may include, for each writer node and publisher node in a graph network, generating a respective embedding with an encoding of one or more labels. The processing device may index each respective embedding in a nearest neighbor vectorial search index. In some embodiments, for each content item node, the processing device may compute a centroid as an average value of an embedding associated with the writer and an embedding associated with the publisher. In some embodiments, the processing device may retrieve, based on distance, a certain number of centroids.

In some embodiments, the processing device may use the one or more machine learning models 154 to identify distances of the links between the nodes. Based on the distances of the links between the nodes, the processing device may determine the respective probability that each identity of the publisher from the identities of publishers is associated with the respective identity of the writer from the identities of writers. In some embodiments, the one or more machine learning models 154 may identify the existences of the links between the nodes based on information pertaining to a structure of the graph network and features of the nodes. The information may include at least one of the identities of writers, the identities of publishers, aliases, and/or content item metadata.

In some embodiments, the processing device may preprocess the representation to initialize each of the nodes and each of the edges with a respective feature vector. In some embodiments, the processing device may convert each respective feature vector into a respective numerical representation using a multilingual language model (e.g., a trained machine learning model that converts vectors into numerical representations). In some embodiments, the processing device may store each respective numerical representation in a dataset. In some embodiments, the training data may include the dataset.

In some embodiments, the processing device may store an embedding layer from the one or more machine learning models 154. The processing device may extract node embeddings relative to entities representing writers and publishers. The processing device may store the node embeddings in a search engine that identifies the identities of publishers and the respective probability that each identity of the publisher from the identities of publishers is associated with the respective identity of the writer from the identities of writers.

At block 204, the processing device may receive, via the one or more machine learning models, a first identity of a first writer.

At block 206, the processing device may input the first identity of the first writer into the one or more machine learning models;

At block 208, the processing device may output, via the one or more machine learning models, the dataset including the identities of publishers and the respective probability that each identity of the publisher, from the identities of publishers, is associated with the respective identity of the writer from the identities of writers.

Figure 3:
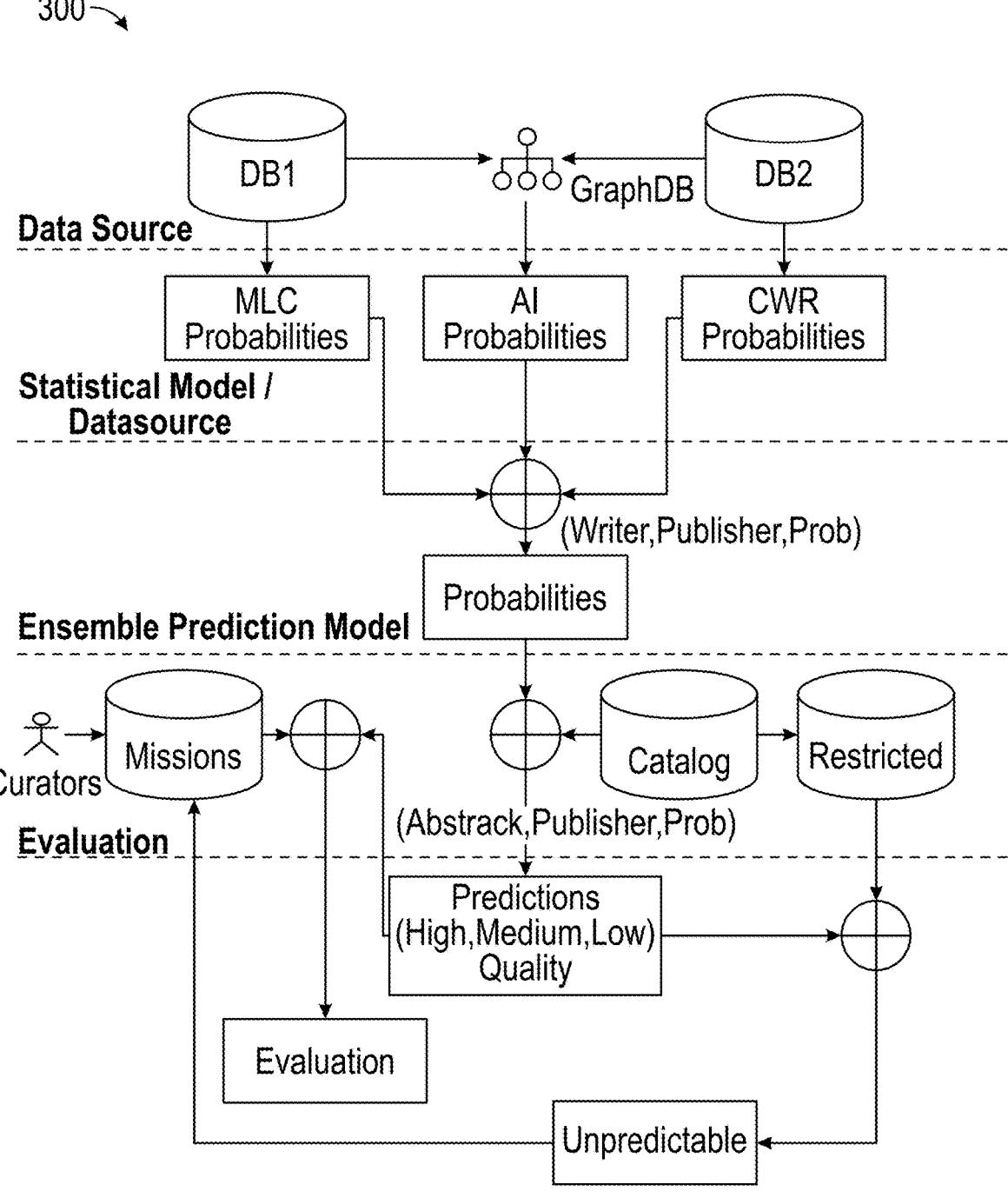
FIG. 3 illustrates an example publisher prediction workflow according to certain embodiments of this disclosure.

FIG. 3 illustrates an example publisher prediction workflow 300 according to certain embodiments of this disclosure. The presented workflow 300 includes a workflow of processes to support the resolution of the most probable publisher to a provided writer identity and to a given content item (e.g., music track). The workflow 300 may retrieve data from different data sources using one or more machine learning models that may be transformed into vectors, embeddings, etc. and processed to determine probabilities for a relation between an identity of a writer and an identity of a publisher. Further, the trained machine learning models may be used to determine a relation between a content item and a publisher.

As depicted, a first layer includes data sources from external data sources. The external data sources may be communicatively coupled to a graph network and the information in the external data sources may be transformed into nodes in the graph network. In some embodiments, the nodes may be linked via edges that identify their relationship between the nodes. In a second layer, statistical modeling may be used to determine first external data source probabilities, artificial intelligence probabilities, and/or second external data source probabilities. The graph network may be used by one or more machine learning models to determine the artificial intelligence probabilities.

In a third layer, ensemble prediction model may be used to combine the first external data source probabilities, AI probabilities, and second external data source probabilities. The combination of the data may result in an output including writer, publisher, and probability of relationship between writer and publisher.

The output from the third layer, may be input into a fourth layer pertaining to evaluation. In this layer, the output from the third layer may be processed, along with a catalog of content items and one or more machine learning models may output a prediction of a publisher associated with a writer and/or content item and a probability of that publisher being associated with the writer and/or content item. The predictions may be ranked high, medium, and low quality. The predications may be processed with missions selected by curators to output an evaluation. The predictions and evaluation may be provided in a fifth level of the workflow 300. Further, the catalog may indicate restricted content items in a database. The restricted items may be processed with the predictions to output unpredictable content items that are provided to the missions database.

Figure 4:
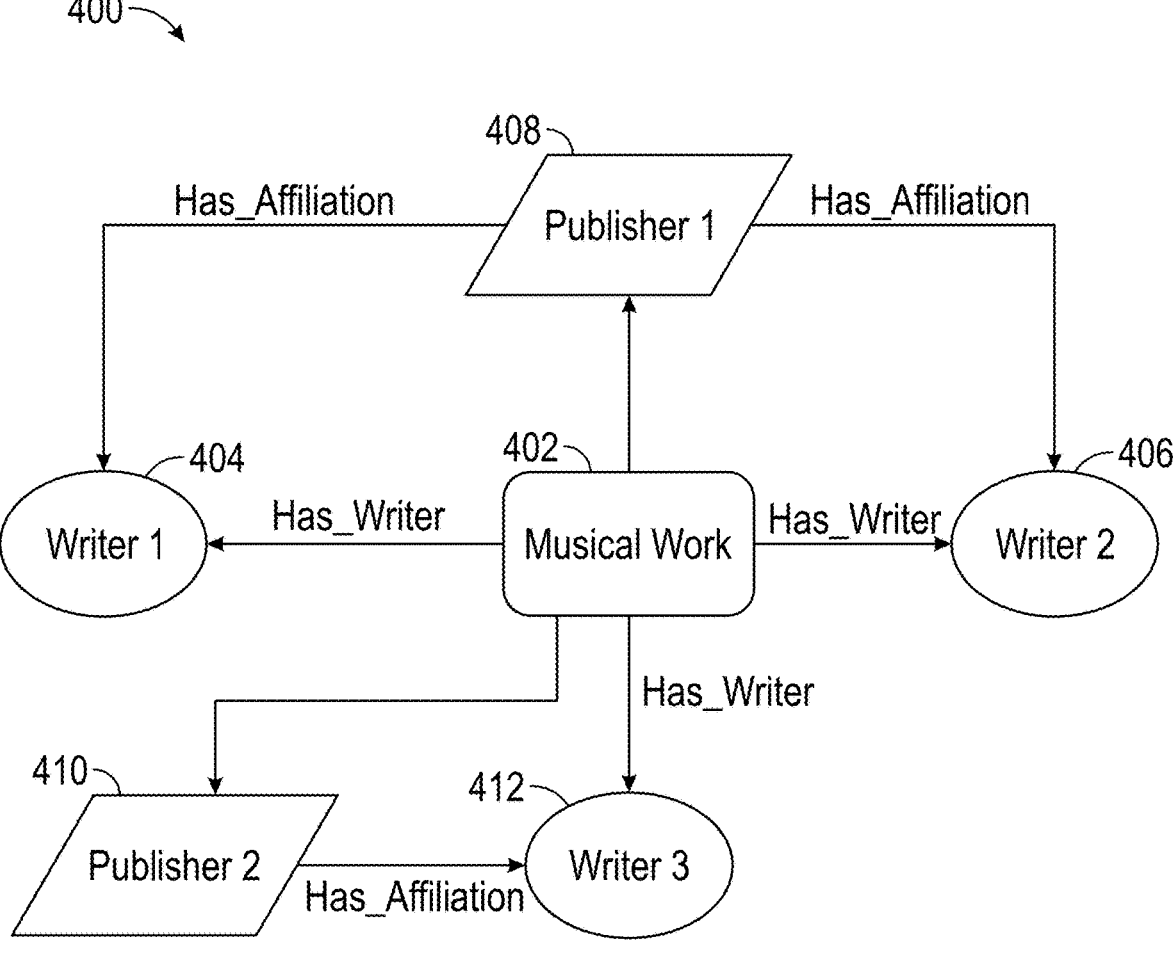
FIG. 4 illustrates an example graph network according to certain embodiments of this disclosure.

FIG. 4 illustrates an example graph network 400 according to certain embodiments of this disclosure. As depicted, the graph network 400 includes nodes for a musical work 402, a writer 1 404, a writer 2 406, a publisher 1 408, a publisher 2 410, and a writer 3 412. One or more machine learning models may be trained based on the graph network 400. Once provided a content item (e.g., song), the graph network 400 may be created by considering all entities as nodes and by connected each entity with a link/edge, based on their affiliation. The graph network 400 includes the nodes and relationships relative to one musical work 402.

The musical work 402 may include a set of writers 404, 406, 412, and a set of publishers 408, 410. The relations between the writers and publishers may be defined by a contractual agreement. The contractual agreement may include addition information such as the percentage of shares owned by a certain publisher for the content item.

Figure 5:
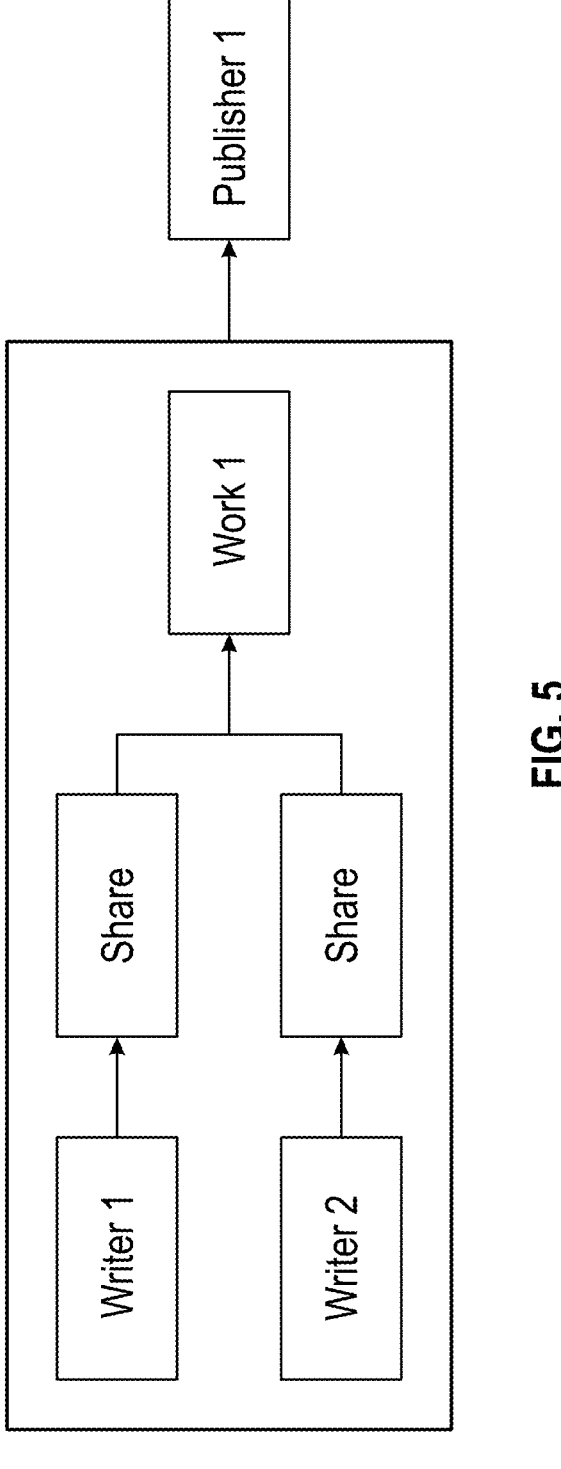
FIG. 5 illustrates an example data model used according to certain embodiments of this disclosure.

FIG. 5 illustrates an example data model 500 used according to certain embodiments of this disclosure. As depicted in the data model 500, there are entities pertaining to writers (songwriters), works, tracks shares between writers and the works, and a publisher. It should be noted that a writer may be defined by an identity (e.g., ROBERT GAUDIO), a publisher may be defined by an identity (e.g., UNIVERSAL MUSIC PUBLISHING), a work may be defined by its own identifier (e.g., WGID), and a track may be defined by its own identity (e.g., ABSTRACK). Further, it should be noted that a writer may have a list of alias names associated with it (e.g., BOB GAUDIO, GAUDIO ROBERT, etc.). A publisher may have a list of alias names associated with it (e.g., HITOPOLIS, HITOPOLICS LLC, etc.). Shares may be equally distributed among writers for a given work i.e., if a work has 3 writers, the shares may be 0.33×3.

Figure 6:
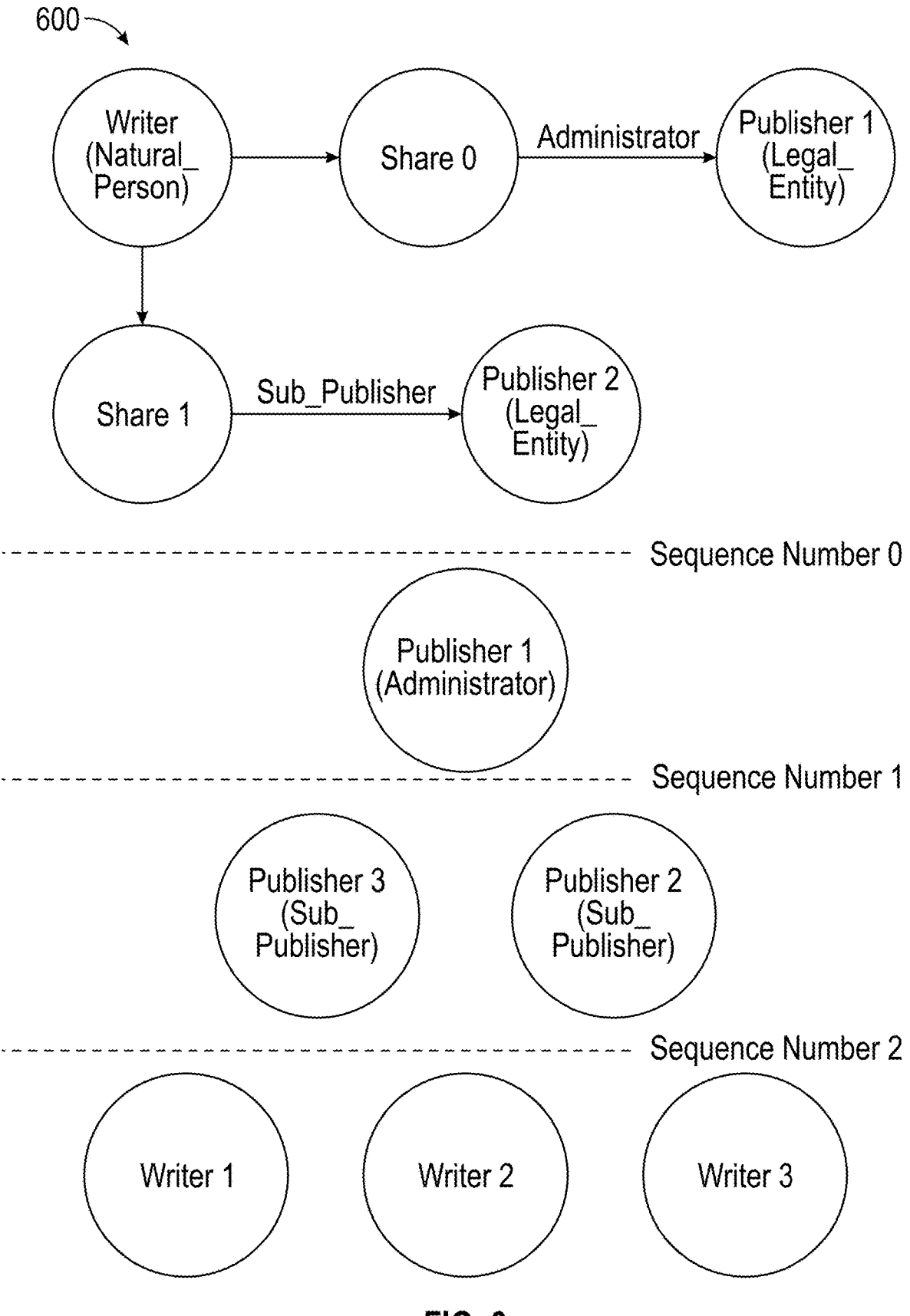
FIG. 6 illustrates an example data schema implementing a relationship between entities including a writer node and a publisher node according to certain embodiments of this disclosure.

FIG. 6 illustrates an example data schema 600 implementing a relationship between entities including a writer node and a publisher node according to certain embodiments of this disclosure. The data schema 600 may depict a relationship between a publisher and a writer. The data schema 600 models the relationship with a hierarchy of publishers (administrators) at level 0, sub publishers (any levels>0), and writers (level=N, last level).

In some embodiments, a probability model may be used which assumes that each event of an observed tuple (writer, publisher) may be independent when obtaining the probability of the tuple as (writer, publisher, probability) for a given writer and publisher entity. In the event that shares are equally distributed, the probability of a publisher Y to be the publisher of a given writer X may be:

$$P(X, Y) = \frac{\text{Number of work by writer } X \text{ with publisher } Y}{\text{Number of work by writer } X}$$

Next, the maximum probability of tuple (writer X, publisher Y) for given writer X may be determined:

$$P(X) = \max(P1, P2, \ldots, PN)$$

Then certain model constraints for executing queries on the data sources may be set:

$$N\text{min} = \text{Number of work by writer } X \geq 10$$

$$P\text{min} = > = 0.5$$

Figure 7:
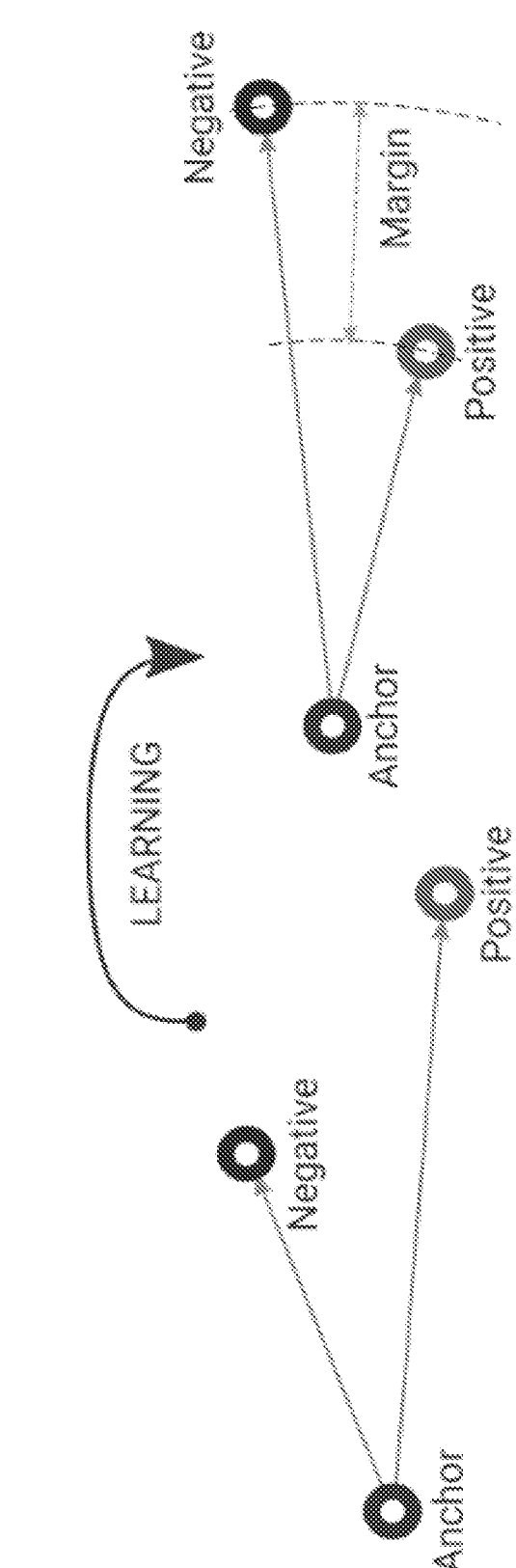
FIG. 7 illustrates a machine learning model implementing a triplet loss function that maximizes distances of publisher nodes that are far away from writer nodes in terms of hops according to certain embodiments of this disclosure.

FIG. 7 illustrates a machine learning model 700 implementing a triplet loss function that maximizes distances of publisher nodes that are far away from writer nodes in terms of hops according to certain embodiments of this disclosure. The machine learning model 700 may be a graph neural network model that contributes to improving the overall probability score of a publisher being associated with a writer and/or content item. The machine learning model 700 may be built on top of a graph that connects the writer node to the publisher node, using as reference the same dataset that is used for the probability model described above. The machine learning model 700 may be implemented based on a tripled loss function. The triple loss function encourages dissimilar pairs of nodes to be distant from any similar pairs of nodes by at least a certain margin value. In some embodiments, the machine learning model 700 is trained to maximize the margin value between the distances at a learning phase such that a "positive" sample may be closer to an "anchor" than a "negative" sample of that margin. As depicted, in some embodiments, the machine learning model 700 is trained to maximize the margin of the negative samples that are publishers far away from writers (e.g., anchors in FIG. 7) in terms of hops.

FIG. 8 illustrates an example of a nearest neighbor implementation 800 identifying each writer node and publisher node of the graph network according to certain embodiments of this disclosure. In some embodiments, for each writer node and publisher node of the graph network, an embedded representation (also referred to as "embeddings" herein) with a specific encoding of labels. In some embodiments, the embeddings may be indexed in an approximated nearest neighbor (ANN) vectorial search index (FAISS) for efficient retrieval of closer embeddings to a given search query. In some embodiments, the search query may be built using a list of available writer nodes to a given track/content item node. As depicted, a distance is determined between a centroid of the writer nodes of a track/content item node and publisher nodes. To that end, for each track/content item node, a centroid (center point of an object and/or nodes; point of intersection of three medians between nodes in a graph network) may be computed as the averaged value of the writer's embedding and the publisher nodes with the top-k nearest (in terms of cosine similarity) centroids may be retrieved.

Figure 9:
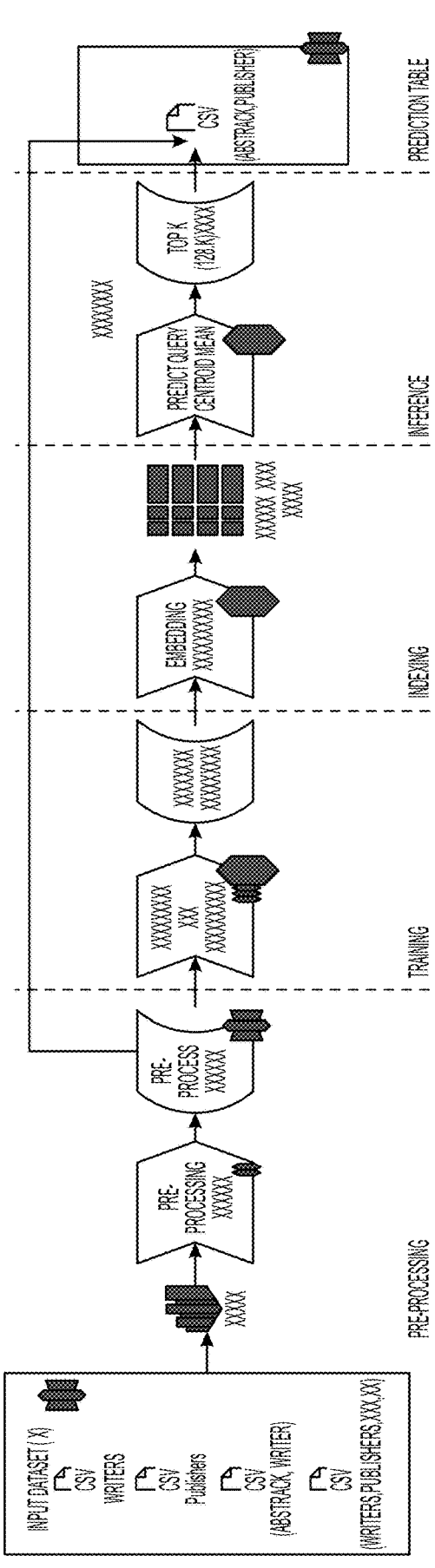
FIG. 9 illustrates an example of training a graph network according to certain embodiments of this disclosure.

FIG. 9 illustrates an example of training a graph network 900 according to certain embodiments of this disclosure. To train the graph network, a pipeline may be implemented. The pipeline may include a preprocessing that processes writers, publisher datasets, etc. Further the pipeline may include distributed data parallel training, to train the model over multiple nodes with multiple graphic processing units (GPU). The graph network 900 may index the approximated nearest neighbor (ANN) spatial index for data embeddings. Further, the pipeline may include inference for centroid calculations and index query.

Figure 10:
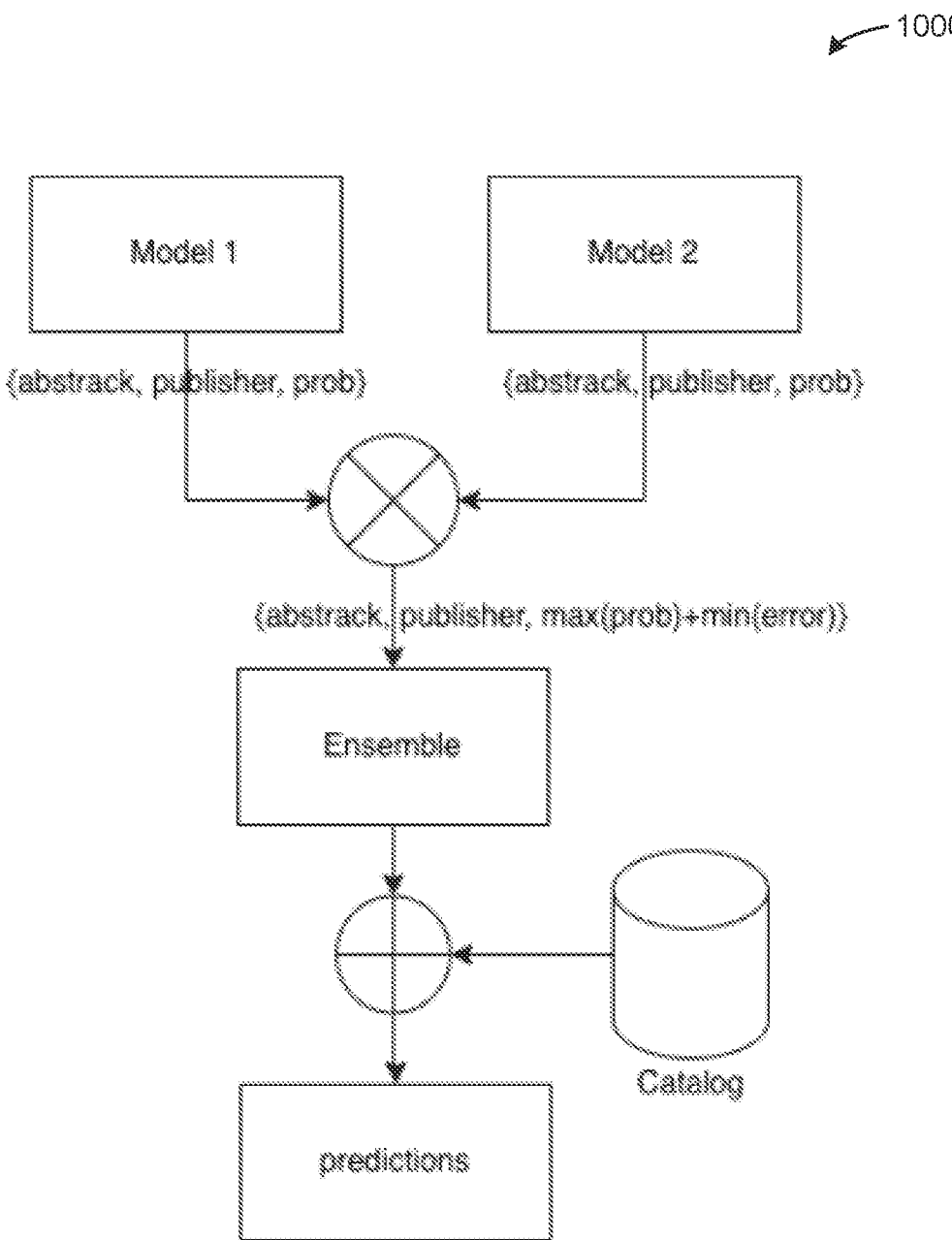
FIG. 10 illustrates an example ensemble probability model that combines probabilities from each model according to embodiments of this disclosure.

FIG. 10 illustrates an example ensemble probability model 1000 that combines probabilities from each model according to embodiments of this disclosure. The ensemble probability model 1000 may combine probability results from all available models according to a set of defined rules that ensure: (i) maximize the catalog coverage i.e., the number of track/content item nodes that the ensemble probability model 1000 can predict, (ii) maximize the probability of predicting the track (track/content item, publisher) tuple, and (iii) minimize the prediction error from available models i.e., the number of wrong predictions for the tuple (track/content item, publisher). As depicted, model 1 may be the probability model (also referred to as "statistical model" herein) and model 2 may be the graph network (also referred to as "graph model" herein). The identity of a content item, publisher, and/or probability that the publisher is associated with the content item and/or an identity of a writer may be processed and output to the ensemble probability model. Further, information from a catalog database may be processed with output from the ensemble probability model to derive final predictions of the publisher(s) being associated with a writer and/or content item and probabilities that the publisher(s) are associated with the writer and/or content item.

FIG. 11 illustrates an example of combined predictions from the statistical model and graph model in order to assign quality scores according to embodiments of this disclosure. As depicted, high quality predictions are determined based on both the statistical model and the graph model are aligned. The medium quality predictions are predictions that come from the statistical model and not in the high quality predictions. The low quality predictions are predictions that come from the graph model only.

In some embodiments, a workflow is implemented to automatically update datasets and predictions on a scheduled basis. The workflow includes a catalog workflow, a statistical model workflow, and a graph model workflow.

Figure 12:
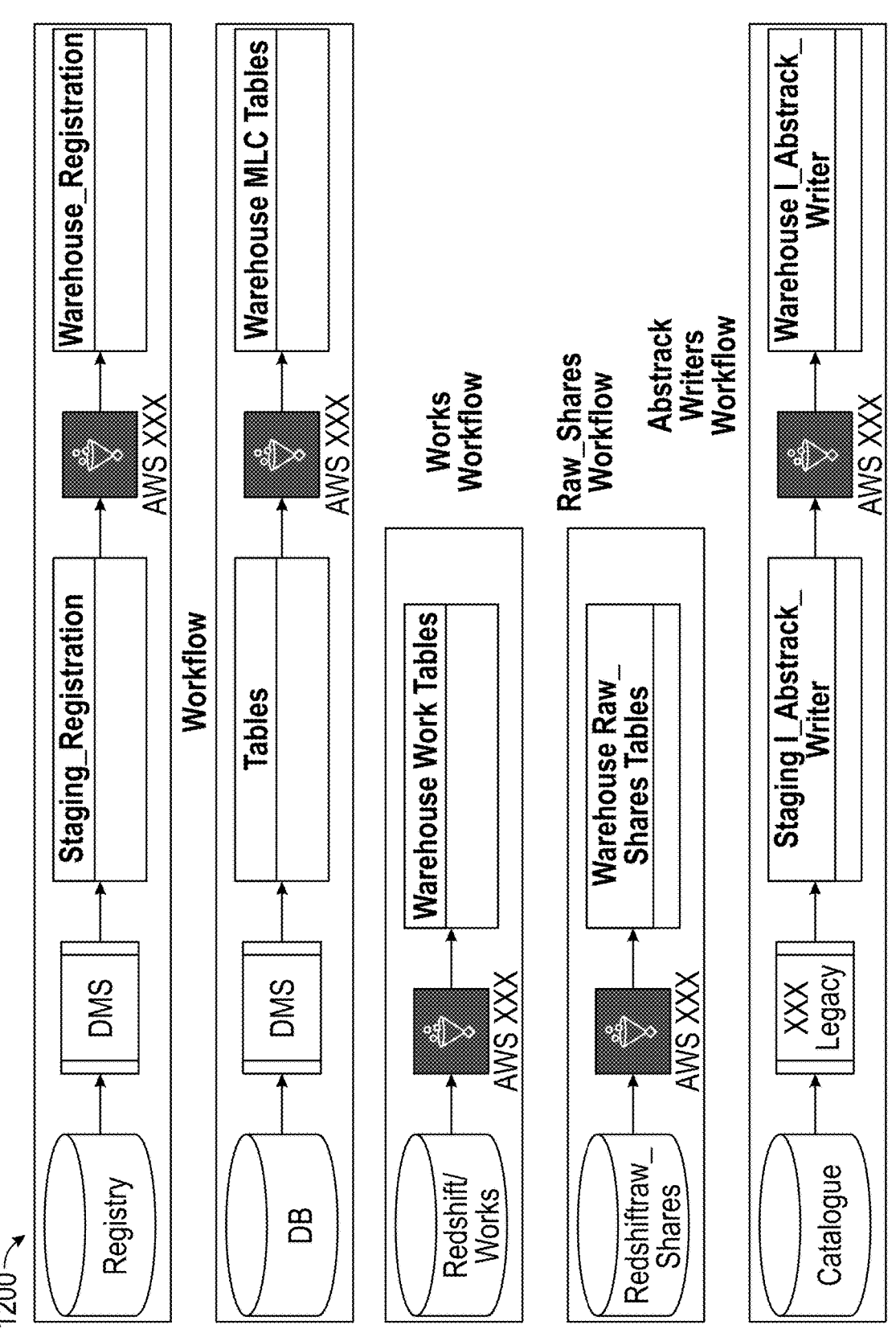
FIG. 12 illustrates an example of a catalog workflow according to embodiments of this disclosure.

FIG. 12 illustrates an example of a catalog workflow 1200 according to embodiments of this disclosure. The catalog workflow 1200 may include a database of a multitude of content items referred to as a tracks catalog. The catalog workflow 1200 also includes a first external works database, a second external works database, and registry writers and publishers databases.

Figure 13:
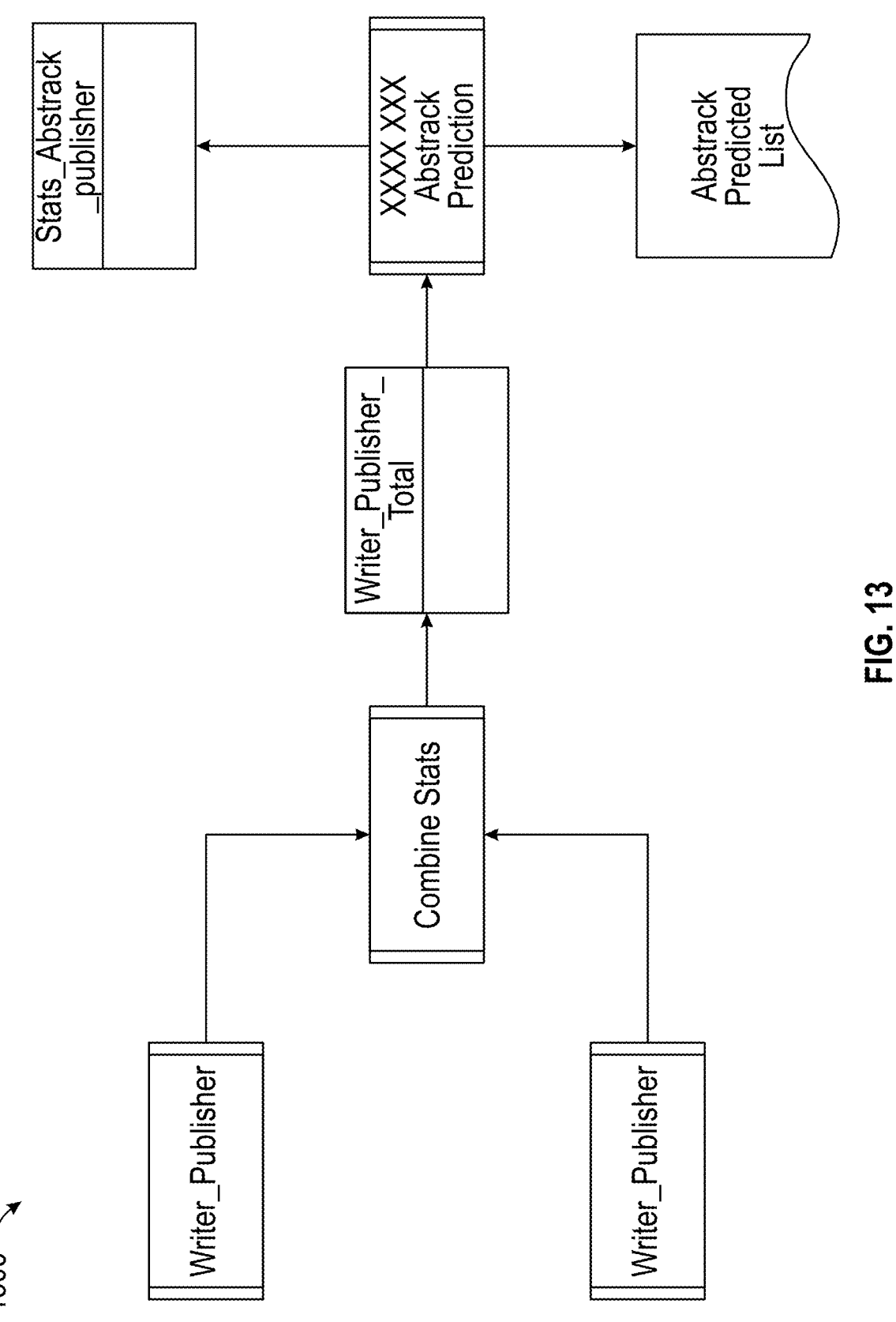
FIG. 13 illustrates an example of a statistical model workflow according to embodiments of this disclosure.

FIG. 13 illustrates an example of a statistical model workflow 1300 according to embodiments of this disclosure. The statistical model workflow 1300 may combine statistical predictions for first predictions for (writer, publisher) tuples and second predictions for (writer, publisher) tuples.

Figure 14:
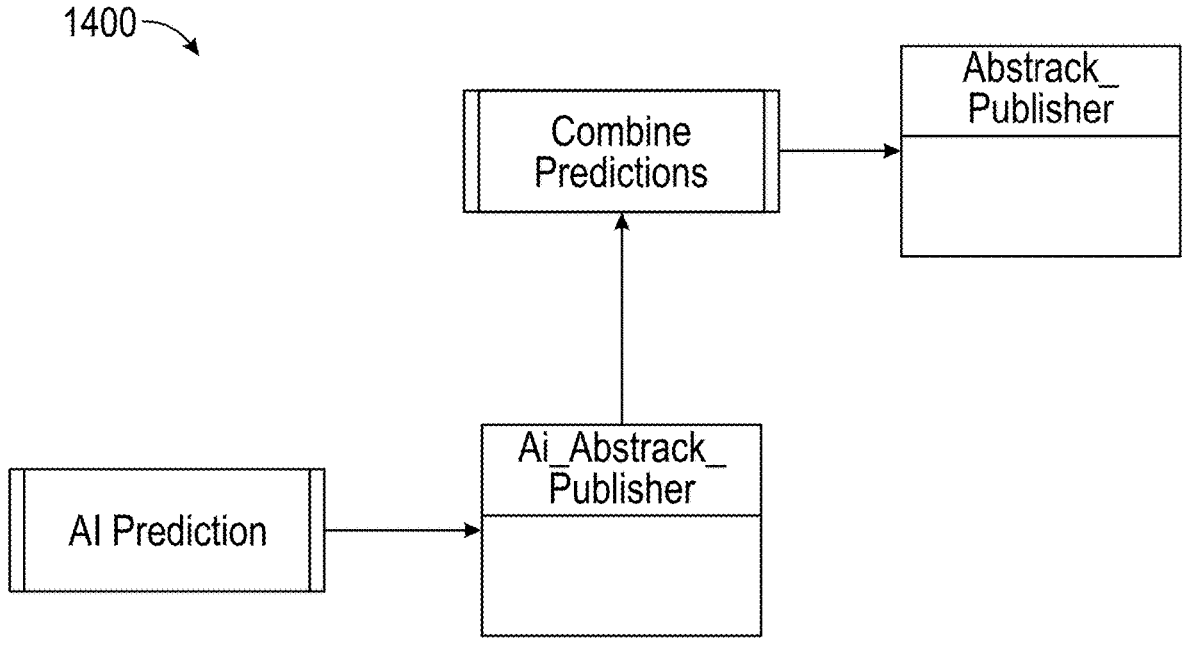
FIG. 14 illustrates an example of a graph model workflow according to embodiments of this disclosure.

FIG. 14 illustrates an example of a graph model workflow 1400 according to embodiments of this disclosure. The graph model workflow 1400 may include graph model predictions that may be combined with statistical model predictions.

Figure 15:
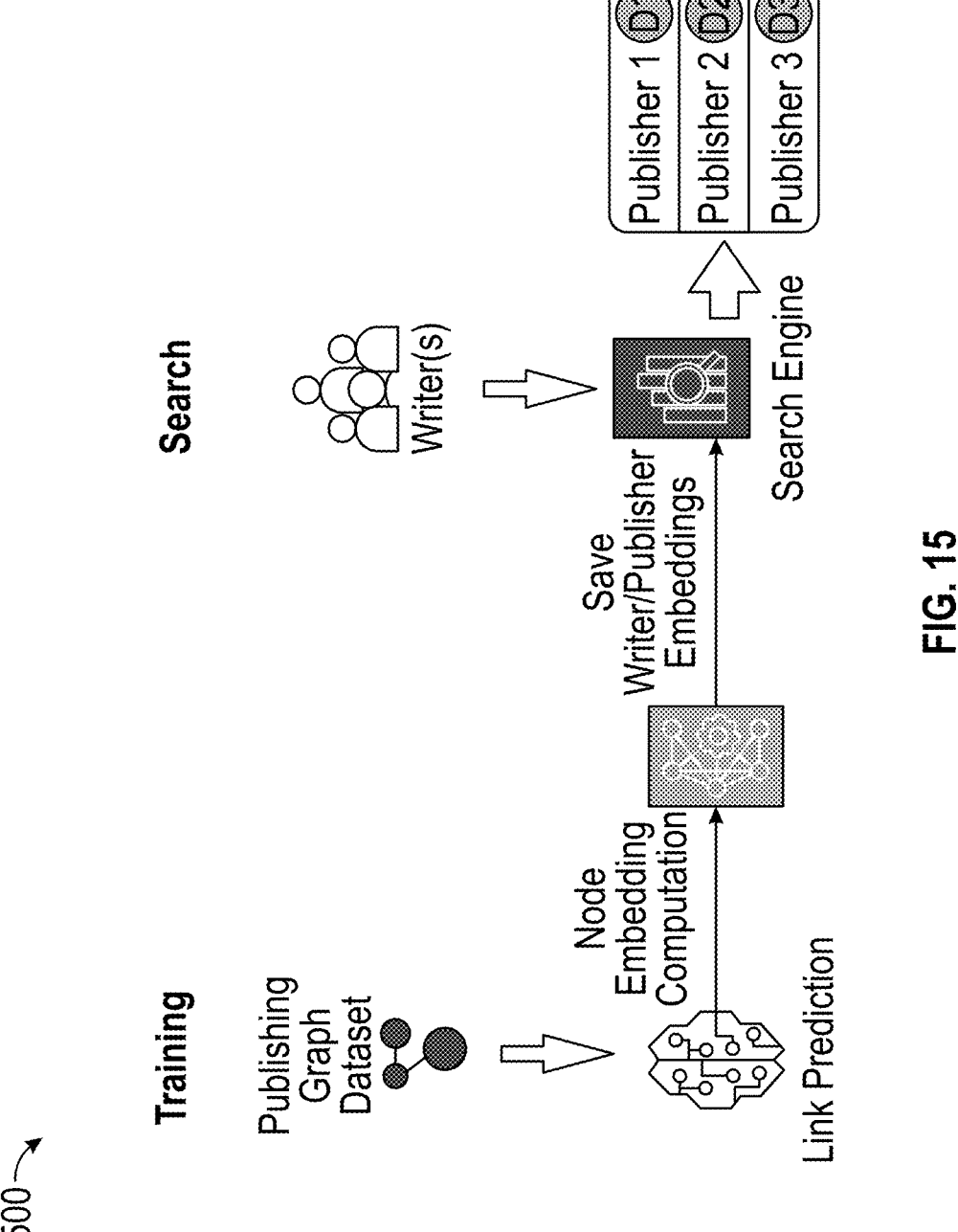
FIG. 15 illustrates an example of a system pipeline overview according to embodiments of this disclosure.

FIG. 15 illustrates an example of a system pipeline overview 1500 according to embodiments of this disclosure. The system pipeline overview 1500 may include an initial phase that creates the publishing graph database. The dataset may be preprocessed such that each node and edge of the graph network is initialized with a feature vector, computed taking into account the additional information of each node. For example, in the case of the node representing a writer, the information may include name, surname, aliases, country, date of birth, etc. The information may be converted into a numerical representation by the use of a multilingual language model. The dataset may be fed to a graph neural network and trained on a link prediction task. After training the model, an embedding layer from the network may be maintained and all node embeddings (e.g., N-dimensional representations) relative to the entities representing writers and publishers may be extracted from the data. The N-dimensional representations may be saved in a search engine. The disclosed system enables computing distance and similarity metrics between different entities that populate a vector index. Multiple types of searches may be supported such as (i) given a writer, search for all most similar writers, (ii) given a writer, search for all most similar publishers (and vice versa), and (iii) given a set of writers, search for all most similar publishers (and vice versa). The search engine may provide probabilities for a set of publishers that are associated with the identity of the writer and/or content item.

Figure 16:
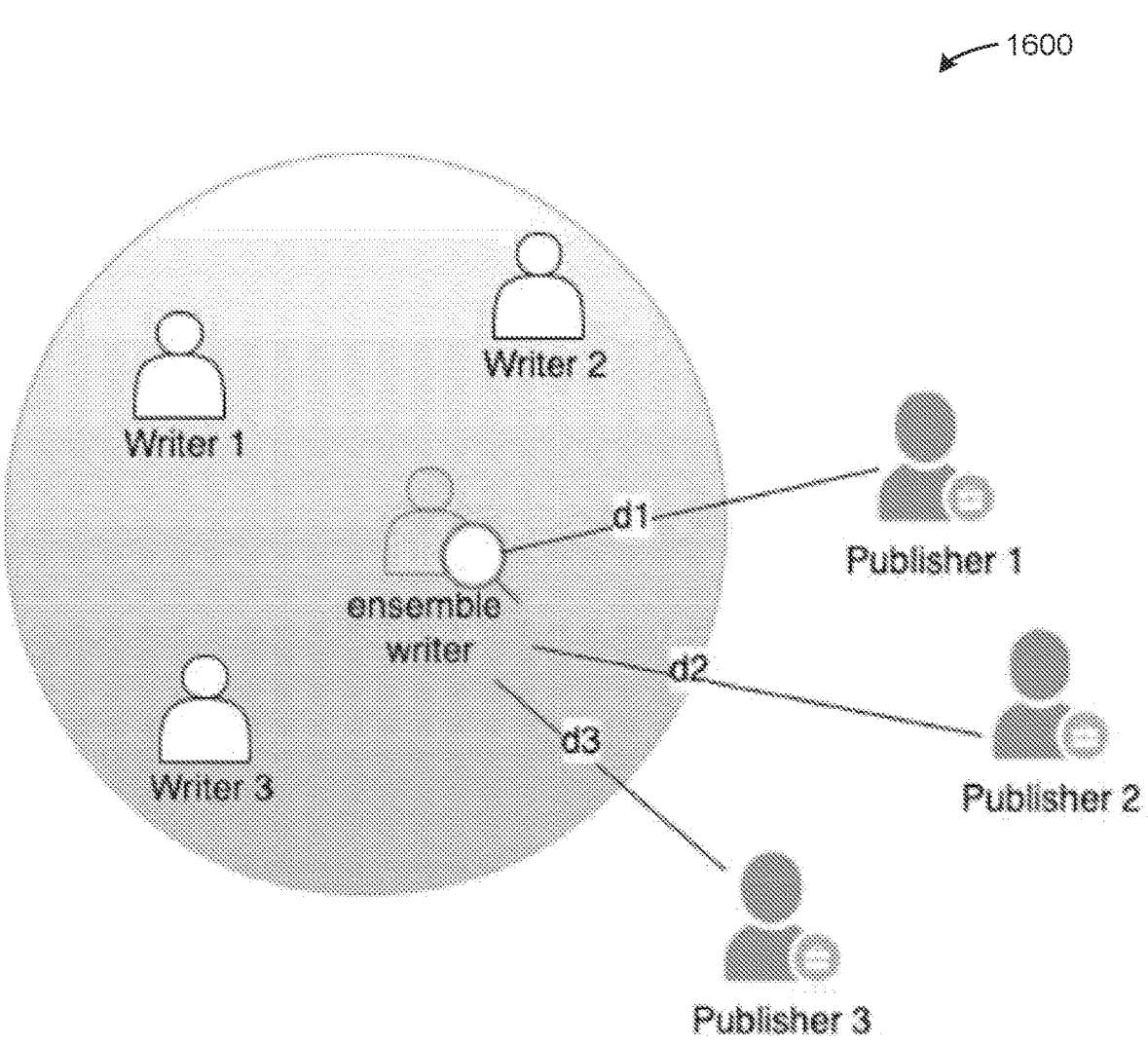
FIG. 16 illustrates an example of implementing ensemble writer similarity searching according to embodiments of this disclosure.

FIG. 16 illustrates an example of implementing ensemble writer similarity searching 1600 according to embodiments of this disclosure. A content item may be composed by multiple writers that have worked together to create it. The graph network may be trained on linked connections of the entire structure of a content item, and in this graph network, nodes representing publishers and writers may be unique. This means that the same writer may have multiple associations with the content item they have worked on and all the publishers they have had an affiliation with. In order to retrieve the most probable publishers associated with a content item, the processing device may detect the writers involved, compute the average of the writers embeddings and use that resulting vector embedding as a query in the search engine, retrieving the first N most similar publishers, ranked by increasing distance.

In some embodiments, the task of predicting the probability of existence of a link between two entity nodes in a graph network is referred to as link prediction. One or more machine learning models may take into account both the graph structure and the node features, such as writers/publishes identities, aliases, their role and all similar types of information.

During the training phase of the one or more machine learning models, one or more machine learning models trained to perform link prediction may learn a unique embedding representation for each node. In some embodiments, distances and similarities may be computed between each entity node in an N-dimensional space.

Figure 17:
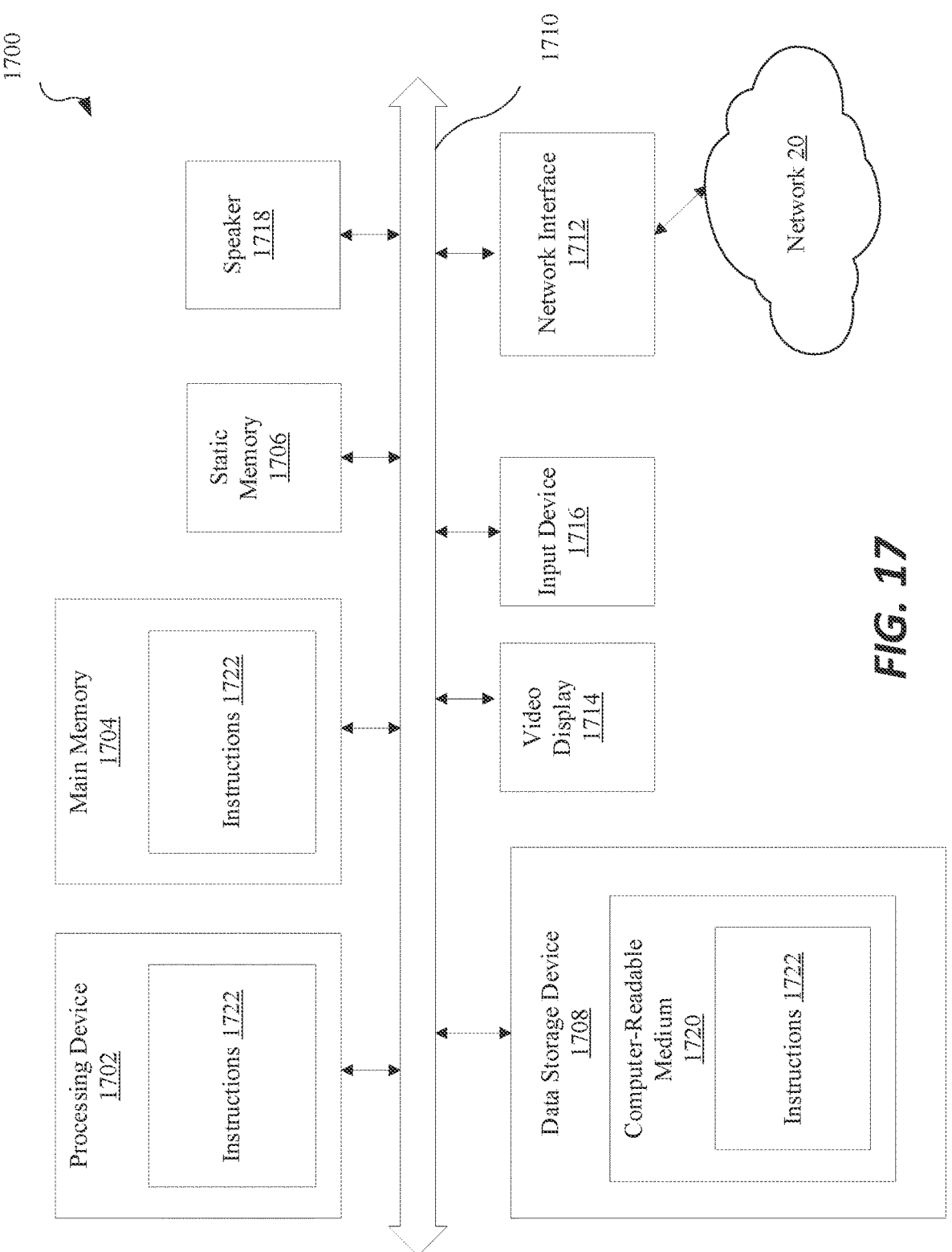
FIG. 17 illustrates an example computer system according to embodiments of this disclosure.

FIG. 17 illustrates an example computer system 1700, which can perform any one or more of the methods described herein. In one example, computer system 1700 may include one or more components that correspond to the computing device 12, one or more servers 128 of the cloud-based computing system 116, or one or more training engines 152 of the cloud-based computing system 116 of FIG. 1. The computer system 1700 may be connected (e.g., networked) to other computer systems in a LAN, an intranet, an extranet, or the Internet. The computer system 1700 may operate in the capacity of a server in a client-server network environment. The computer system 1700 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1700 includes a processing device 1702, a main memory 1704 (e.g., read-only memory (ROM), solid state drive (SSD), flash memory, dynamic random access memory (DRAM) such as synchronous DRAM (SDRAM)), a static memory 1706 (e.g., solid state drive (SSD), flash memory, static random access memory (SRAM)), and a data storage device 1708, which communicate with each other via a bus 1710.

Processing device 1702 represents one or more general-purpose processing devices such as a microprocessor, central processing unit, or the like. More particularly, the processing device 1702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1702 may also be one or more special-purpose processing devices such as an application specific integrated circuit (ASIC), a field programmable gate array (FPGA), a digital signal processor (DSP), network processor, or the like. The processing device 1702 is configured to execute instructions for performing any of the operations and steps of any of the methods discussed herein.

The computer system 1700 may further include a network interface device 1712. The computer system 1700 also may include a video display 1714 (e.g., a liquid crystal display (LCD) or a cathode ray tube (CRT)), one or more input devices 1716 (e.g., a keyboard and/or a mouse), and one or more speakers 1718 (e.g., a speaker). In one illustrative example, the video display 1714 and the input device(s) 1716 may be combined into a single component or device (e.g., an LCD touch screen).

The data storage device 1716 may include a computer-readable medium 1720 on which the instructions 1722 embodying any one or more of the methodologies or functions described herein are stored. The instructions 1722 may also reside, completely or at least partially, within the main memory 1704 and/or within the processing device 1702 during execution thereof by the computer system 1700. As such, the main memory 1704 and the processing device 1702 also constitute computer-readable media. The instructions 1722 may further be transmitted or received over a network 20 via the network interface device 1712.

While the computer-readable storage medium 1720 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

CLAUSES

1. A computer-implemented method comprising:
   training, using an artificial intelligence engine, one or more machine learning models using training data comprising identities of writers of content items as input and to output a dataset comprising identities of publishers and a respective probability that each identity of a publisher from the identities of publishers is associated with a respective identity of a writer from the identities of writers;
   receiving, via the one or more machine learning models, a first identity of a first writer;
   inputting the first identity of the first writer into the one or more machine learning models;
   outputting, via the one or more machine learning models, the dataset comprising the identities of publishers and the respective probability that each identity of the publisher, from the identities of publishers, is associated with the respective identity of the writer from the identities of writers.

2. The computer-implemented method of any clause herein, wherein the one or more machine learning models are trained using a representation of both nodes and edges and the one or more machine learning models are trained to identify existences of links between the nodes.

3. The computer-implemented method of any clause herein, wherein the nodes represent entities comprising writers, content item metadata, contractual agreements, shares included in the contractual agreements, publishers, work titles, or some combination thereof.

4. The computer-implemented method of any clause herein, further comprising:

using the one or more machine learning models to identify distances of the links between the nodes; and based on the distances of the links between the nodes, determining the respective probability that each identity of the publisher from the identities of publishers is associated with the respective identity of the writer from the identities of writers.

5. The computer-implemented method of any clause herein, wherein the representation comprises a graph network.

6. The computer-implemented method of any clause herein, further comprising:

preprocessing the representation to initialize each of the nodes and each of the edges with a respective feature vector;

converting each respective feature vector into a respective numerical representation using a multilingual language model; and storing each respective numerical representation in a dataset.

7. The computer-implemented method of any clause herein, wherein the training data comprises the dataset.

8. The computer-implemented method of claim 1, further comprising:

storing an embedding layer from the one or more machine learning models;

extracting node embeddings relative to entities representing writers and publishers; and storing the node embeddings in a search engine that identifies the identities of publishers and the respective probability that each identity of the publisher from the identities of publishers is associated with the respective identity of the writer from the identities of writers.

9. The computer-implemented method of any clause herein, wherein the one or more machine learning model identifies the existences of the links between the nodes based on information pertaining to a structure of a graph and features of the nodes, wherein the information comprises at least one of the identities of writers, the identities of publishers, aliases, and content item metadata.

10. The computer-implemented method of any clause herein, wherein training the one or more machine learning models further comprises using a function that arranges dissimilar pairs of writer nodes and publisher nodes to be distant from any similar pairs by at least a certain margin value.

11. The computer-implemented method of any clause herein, wherein training the one or more machine learning models further comprises:

for each writer node and publisher node in a graph network, generating a respective embedding with an encoding of one or more labels;

indexing each respective embedding in a nearest neighbor vectorial search index;

for each content item node, computing a centroid as an average value of an embedding associated with the writer and an embedding associated with the publisher;

retrieving, based on distance, a certain number of centroids.

12. A tangible, non-transitory computer-readable medium storing instructions that, when executed, cause a processing device to:

train, using an artificial intelligence engine, one or more machine learning models using training data comprising identities of writers of content items as input and to output a dataset comprising identities of publishers and a respective probability that each identity of a publisher from the identities of publishers is associated with a respective identity of a writer from the identities of writers;

receive, via the one or more machine learning models, a first identity of a first writer;

input the first identity of the first writer into the one or more machine learning models;

output, via the one or more machine learning models, the dataset comprising the identities of publishers and the respective probability that each identity of the publisher, from the identities of publishers, is associated with the respective identity of the writer from the identities of writers.

13. The computer-readable medium of any clause herein, wherein the one or more machine learning model is trained using a representation of both nodes and edges and the one or more machine learning model is trained to identify existences of links between the nodes.

14. The computer-readable medium of any clause herein, wherein the nodes represent entities comprising writers, content item metadata, contractual agreements, shares included in the contractual agreements, publishers, work titles, or some combination thereof.

15. The computer-readable medium of any clause herein, further comprising:

using the one or more machine learning models to identify distances of the links between the nodes; and based on the distances of the links between the nodes, determining the respective probability that each identity of the publisher from the identities of publishers is associated with the respective identity of the writer from the identities of writers.

16. The computer-readable medium of any clause herein, wherein the representation comprises a graph network.

17. The computer-readable medium of any clause herein, further comprising:

preprocessing the representation to initialize each of the nodes and each of the edges with a respective feature vector;

converting each respective feature vector into a respective numerical representation using a multilingual language model; and storing each respective numerical representation in a dataset.

18. The computer-readable medium of any clause herein, wherein the training data comprises the dataset.

19. The computer-readable medium of any clause herein, further comprising:

storing an embedding layer from the one or more machine learning models;

extracting node embeddings relative to entities representing writers and publishers; and saving the node embeddings in a search engine that identifies the identities of publishers and the respective probability that each identity of the publisher from the identities of publishers is associated with the respective identity of the writer from the identities of writers.

20. A system comprising:

a memory device storing instructions; and a processing device communicatively coupled to the memory device, wherein the processing device executes the instructions to:

train, using an artificial intelligence engine, one or more machine learning models using training data comprising identities of writers of content items as input and to output a dataset comprising identities of publishers and a respective probability that each identity of a publisher from the identities of publishers is associated with a respective identity of a writer from the identities of writers;

receive, via the one or more machine learning models, a first identity of a first writer;

input the first identity of the first writer into the one or more machine learning models;

output, via the one or more machine learning models, the dataset comprising the identities of publishers and the respective probability that each identity of the publisher, from the identities of publishers, is associated with the respective identity of the writer from the identities of writers.

The invention claimed is:

1. A computer-implemented method comprising:

training, using an artificial intelligence engine, one or more machine learning models using training data comprising identities of writers of content items as input and to output a dataset comprising identities of publishers and a respective probability that each identity of a publisher from the identities of publishers is associated with a respective identity of a writer from the identities of writers;

receiving, via the one or more machine learning models, a first identity of a first writer;

inputting the first identity of the first writer into the one or more machine learning models;

outputting, via the one or more machine learning models, the dataset comprising the identities of publishers and the respective probability that each identity of the publisher, from the identities of publishers, is associated with the respective identity of the writer from the identities of writers.

2. The computer-implemented method of claim 1, wherein the one or more machine learning models are trained using a representation of both nodes and edges and the one or more machine learning model is trained to identify existences of links between the nodes.

3. The computer-implemented method of claim 2, wherein the nodes represent entities comprising writers, content item metadata, contractual agreements, shares included in the contractual agreements, publishers, work titles, or some combination thereof.

4. The computer-implemented method of claim 2, further comprising:

using the one or more machine learning models to identify distances of the links between the nodes; and based on the distances of the links between the nodes, determining the respective probability that each identity of the publisher from the identities of publishers is associated with the respective identity of the writer from the identities of writers.

5. The computer-implemented method of claim 2, wherein the representation comprises a graph network.

6. The computer-implemented method of claim 2, further comprising:

preprocessing the representation to initialize each of the nodes and each of the edges with a respective feature vector;

converting each respective feature vector into a respective numerical representation using a multilingual language model; and storing each respective numerical representation in a dataset.

7. The computer-implemented method of claim 6, wherein the training data comprises the dataset.

8. The computer-implemented method of claim 1, further comprising:

storing an embedding layer from the one or more machine learning models;

extracting node embeddings relative to entities representing writers and publishers; and storing the node embeddings in a search engine that identifies the identities of publishers and the respective probability that each identity of the publisher from the identities of publishers is associated with the respective identity of the writer from the identities of writers.

9. The computer-implemented method of claim 2, wherein the one or more machine learning model identifies the existences of the links between the nodes based on information pertaining to a structure of a graph and features of the nodes, wherein the information comprises at least one of the identities of writers, the identities of publishers, aliases, and content item metadata.

10. The computer-implemented method of claim 1, wherein training the one or more machine learning models further comprises using a function that arranges dissimilar pairs of writer nodes and publisher nodes to be distant from any similar pairs by at least a certain margin value.

11. The computer-implemented method of claim 1, wherein training the one or more machine learning models further comprises:

for each writer node and publisher node in a graph network, generating a respective embedding with an encoding of one or more labels;

indexing each respective embedding in a nearest neighbor vectorial search index;

for each content item node, computing a centroid as an average value of an embedding associated with the writer and an embedding associated with the publisher;

retrieving, based on distance, a certain number of centroids.

12. A tangible, non-transitory computer-readable medium storing instructions that, when executed, cause a processing device to:

train, using an artificial intelligence engine, one or more machine learning models using training data comprising identities of writers of content items as input and to output a dataset comprising identities of publishers and a respective probability that each identity of a publisher from the identities of publishers is associated with a respective identity of a writer from the identities of writers;

receive, via the one or more machine learning models, a first identity of a first writer;

input the first identity of the first writer into the one or more machine learning models;

output, via the one or more machine learning models, the dataset comprising the identities of publishers and the respective probability that each identity of the publisher, from the identities of publishers, is associated with the respective identity of the writer from the identities of writers.

13. The computer-readable medium of claim 12, wherein the one or more machine learning model is trained using a representation of both nodes and edges and the one or more machine learning model is trained to identify existences of links between the nodes.

14. The computer-readable medium of claim 13, wherein the nodes represent entities comprising writers, content item metadata, contractual agreements, shares included in the contractual agreements, publishers, work titles, or some combination thereof.

15. The computer-readable medium of claim 13, further comprising:

using the one or more machine learning models to identify distances of the links between the nodes; and based on the distances of the links between the nodes, determining the respective probability that each identity of the publisher from the identities of publishers is associated with the respective identity of the writer from the identities of writers.

16. The computer-readable medium of claim 13, wherein the representation comprises a graph network.

17. The computer-readable medium of claim 13, further comprising:

preprocessing the representation to initialize each of the nodes and each of the edges with a respective feature vector;

converting each respective feature vector into a respective numerical representation using a multilingual language model; and storing each respective numerical representation in a dataset.

18. The computer-readable medium of claim 17, wherein the training data comprises the dataset.

19. The computer-readable medium of claim 12, further comprising:

storing an embedding layer from the one or more machine learning models;

extracting node embeddings relative to entities representing writers and publishers; and saving the node embeddings in a search engine that identifies the identities of publishers and the respective probability that each identity of the publisher from the identities of publishers is associated with the respective identity of the writer from the identities of writers.

20. A system comprising:

a memory device storing instructions; and a processing device communicatively coupled to the memory device, wherein the processing device executes the instructions to:

train, using an artificial intelligence engine, one or more machine learning models using training data comprising identities of writers of content items as input and to output a dataset comprising identities of publishers and a respective probability that each identity of a publisher from the identities of publishers is associated with a respective identity of a writer from the identities of writers;

receive, via the one or more machine learning models, a first identity of a first writer;

input the first identity of the first writer into the one or more machine learning models;

output, via the one or more machine learning models, the dataset comprising the identities of publishers and the respective probability that each identity of the publisher, from the identities of publishers, is associated with the respective identity of the writer from the identities of writers.

\* \* \* \* \*